United States Patent
Kubota et al.

(10) Patent No.: US 9,706,570 B2
(45) Date of Patent: *Jul. 11, 2017

(54) APPARATUS, METHOD AND COMPUTER PROGRAM FOR COMMUNICATING VIA A PLURALITY OF NETWORKS

(71) Applicant: AVAGO TECHNOLOGIES GENERAL IP (SINGAPORE) PTE. LTD., Singapore (SG)

(72) Inventors: Keiichi Kubota, Weybridge (GB); Brian Martin, Farnham (GB)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,026

(22) Filed: Aug. 17, 2016

(65) Prior Publication Data

US 2016/0360552 A1 Dec. 8, 2016

Related U.S. Application Data

(63) Continuation of application No. 14/160,039, filed on Jan. 21, 2014, now Pat. No. 9,426,824.

(30) Foreign Application Priority Data

Jan. 18, 2013 (GB) .................................. 1300922.0

(51) Int. Cl.
*H04J 3/14* (2006.01)
*H04W 4/00* (2009.01)
(Continued)

(52) U.S. Cl.
CPC ............ *H04W 74/02* (2013.01); *H04W 36/14* (2013.01); *H04W 48/02* (2013.01); *H04W 48/10* (2013.01); *H04W 48/16* (2013.01)

(58) Field of Classification Search
CPC ...... H04W 36/14; H04W 48/12; H04W 74/02
See application file for complete search history.

(56) References Cited

U.S. PATENT DOCUMENTS

2009/0034452 A1 2/2009 Somasundaram et al.
2011/0143712 A1 6/2011 Christensson et al.
(Continued)

FOREIGN PATENT DOCUMENTS

WO  WO 2012-147049 A1  11/2012
WO  WO 2012-174440 A1  12/2012

*Primary Examiner* — Shaq Taha
*Assistant Examiner* — Ryan Kavleski
(74) *Attorney, Agent, or Firm* — Oblon, McClelland, Maier & Neustadt, L.L.P.

(57) ABSTRACT

Access control information is received from a first network, which is the device's serving network (500). The received access control information is stored as access control settings (505). A first connection is established via the serving network based on one or more of the access control settings (510). It is determined that the device's serving network has changed to a second network (515). At least a portion of the access control setting is replaced with default access control settings (520). The access control settings may comprise one or more packet-domain settings and one or more circuit-domain settings. The access control information may comprise Domain Specific Access Control (DSAC) and/or Paying Permission with Access Control (PPAC) information. The default access control settings may comprise access class barring (ACB) information.

20 Claims, 8 Drawing Sheets

(51) Int. Cl.
    *H04W 74/02* (2009.01)
    *H04W 36/14* (2009.01)
    *H04W 48/16* (2009.01)
    *H04W 48/02* (2009.01)
    *H04W 48/10* (2009.01)

(56) References Cited

U.S. PATENT DOCUMENTS

| | | | |
|---|---|---|---|
| 2012/0002545 A1* | 1/2012 | Watfa | H04W 48/06 |
| | | | 370/235 |
| 2012/0170503 A1 | 7/2012 | Kelley et al. | |
| 2013/0281090 A1 | 10/2013 | Maeda et al. | |
| 2014/0169240 A1* | 6/2014 | Han | H04W 48/02 |
| | | | 370/280 |
| 2014/0171061 A1 | 6/2014 | Larmo et al. | |
| 2015/0071064 A1 | 3/2015 | Geng et al. | |
| 2015/0223144 A1 | 8/2015 | Lee et al. | |
| 2015/0237566 A1 | 8/2015 | Lee et al. | |

\* cited by examiner

APPARATUS, METHOD AND COMPUTER PROGRAM FOR COMMUNICATING VIA A PLURALITY OF NETWORKS

CROSS-REFERENCE TO RELATED APPLICATIONS

The present application is a continuation application which claims the benefit of priority under 35 U.S.C. §120 of U.S. patent application Ser. No. 14/160,039, filed Jan. 21, 2014, which claims priority to British patent application no. 1300922.0, filed Jan. 18, 2013; the entire contents of each of which are incorporated herein by reference.

TECHNICAL FIELD

The present invention relates to apparatus, a method and a computer program for communicating via a plurality of networks subject to access controls. The disclosure herein relates generally to the field of wireless or cellular communications, and particular embodiments relate to controlling access of a device to a network, and methods for devices to update access control settings while maintaining an active circuit or packet-domain connection.

BACKGROUND

The Third Generation Partnership Project (3GPP) unites six telecommunications standards bodies, known as "Organizational Partners", and provides their members with a stable environment to produce the highly successful Reports and Specifications that define 3GPP technologies. These technologies are constantly evolving through what have become known as "generations" of commercial cellular/mobile systems. 3GPP also uses a system of parallel "releases" to provide developers with a stable platform for implementation and to allow for the addition of new features required by the market. Each release includes specific functionality and features that are specified in detail by the version of the 3GPP standards associated with that release.

Universal Mobile Telecommunication System (UMTS) is an umbrella term for the third generation (3G) technologies developed within 3GPP and initially standardised in Release 4 and Release 99, which preceded Release 4. UMTS includes specifications for both the UMTS Terrestrial Radio Access Network (UTRAN) as well as the Core Network. UTRAN includes the original Wideband CDMA (W-CDMA) radio access technology that uses paired or unpaired 5-MHz channels, initially within frequency bands near 2 GHz but subsequently expanded into other licensed frequency bands. The UTRAN generally includes nude-Bs (NBs) and radio network controllers (RNCs). Similarly, GSM/EDGE is an umbrella term for the second-generation (2G) radio technologies initially developed within the European Telecommunication Standards Institute (ETSI) but now further developed and maintained by 3GPP. The GSM/EDGE Radio Access Network (GERAN) generally comprises base stations (BTSs) and base station controllers (BSCs).

Long Term Evolution (LTE) is another umbrella term for so-called fourth-generation (4G) radio access technologies developed within and initially standardised in Releases 8 and 9, also known as Evolved UTRAN (E-UTRAN). As with UMTS, LTE is targeted at various licensed frequency bands, including the 700-MHz band in the United States. LTE is accompanied by improvement to non-radio aspects commonly referred to as System Architecture Evolution (SAE) or Evolved Packet Subsystem (EPS), which includes Evolved Packet Core (EPC) network. LTE continues to evolve through subsequent releases. One of the features under consideration for Release 11 is art enhanced Physical Downlink Control Channel (cPDCCH), which has the goals of increasing capacity and improving spatial reuse of control channel resources, improving inter-cell interference coordination (ICIC), and supporting antenna beamforming and/or transmit diversity for control channel.

SUMMARY

According to a first aspect of the present invention, there is provided a method for a communication device to communicate via a plurality of networks subject to access controls, the method comprising: receiving access control information from a first network, wherein said first network is the device's serving network; storing the received access control information as a plurality of access control settings; establishing a first connection via the serving network based on one or more of the access control settings; determining that the device's serving network has changed from the first network to a second network; and replacing at least a portion of the plurality of access control settings with corresponding default access control settings.

In some embodiments, the access control settings comprise one or more packet-switched (PS) domain access control settings and one or more circuit-switched (CS) domain access control settings. In some embodiments, the access control information comprises at least one of Domain Specific Access Control (DSAC) information and Paging Permission with Access Control (PPAC) information. In some embodiments, the default access control settings comprise access class barring (ACB) information.

In some embodiments, the method comprises establishing a second connection via the second network based on one or more of the access control settings, wherein at least one of the assess control settings used to establish the second connection is different from the access control settings used to establish the first connection. In some embodiments, one of the first and second connections comprises a packet-switched (PS) domain connection and the other of the first and second connections is a circuit-switched (CS) domain connection, and each of the first and second connections is established based on an access control setting corresponding to the type of the connection. In some embodiments, the first and the second networks each comprises a radio network subsystem (RNS), establishing the first connection comprises establishing a Radio Resource Control (RRC) connection, the received access control information comprises system information broadcast by the first RNS and determining that the device's serving network has changed from the first network to the second network comprises receiving an RRC message associated with a serving RNS (SRNS) relocation procedure. Embodiments include devices, apparatus, and computer-readable media embodying one or more of the above methods.

According to a second aspect of the present invention, there is provided apparatus capable of communicating via a plurality of networks subject to access controls, the apparatus comprising: a processing system constructed and arranged to cause the apparatus to: receive access control information from a first network, wherein said first network is the apparatus' serving network; store the received access control information as a plurality of access control settings; establish a first connection via the serving network based on one or more of the access control settings; determine that the apparatus serving network has changed from the first network to a second network; and replace at least a portion of the plurality of access control settings with corresponding default access control settings.

According to a third aspect of the present invention, there is provided a computer program comprising a set of instructions which, when executed by an apparatus capable of communicating via a plurality of networks subject to access controls, causes the apparatus to: receive access control information from a first network, wherein said first network is the apparatus' serving network; store the received access control information as a plurality of access control settings; establish a first connection via the serving network based on one or more of the access control settings; determine that the apparatus' serving network has changed from the first network to a second network; and replace at least a portion of the plurality of access control settings with corresponding default access control settings.

There may be provided a non-transitory computer-readable storage medium comprising a set of computer-readable instructions stored thereon, which, when executed by a processing system, cause the processing system to carry out any of the methods as described above.

The processing systems described above may comprise at least one processor and at least one memory including computer program instructions, the at least one memory and the computer program instructions being configured to, with the at least one processor, cause the apparatus at least to perform as described above.

There may also be provided apparatus, comprising: a transmitter means; a receiver means; at least one processor means; and at least one memory means comprising program code that, when executed by the at least one processor means, causes the apparatus to: receive access control information from a first network, wherein said first network is the apparatus' serving network; store the received access control information as a plurality of access control settings; establish a first connection via the serving network based on one or more of the access control settings; determine that the apparatus' serving network has changed from the first network to a second network; and replace at least a portion of the plurality of access control settings with corresponding default access control settings.

Further features and advantages of the invention will become apparent from the following description of preferred embodiments of the invention, given by way of example only, which is made with reference to the accompanying drawings.

DETAILED DESCRIPTION

Figure 1:
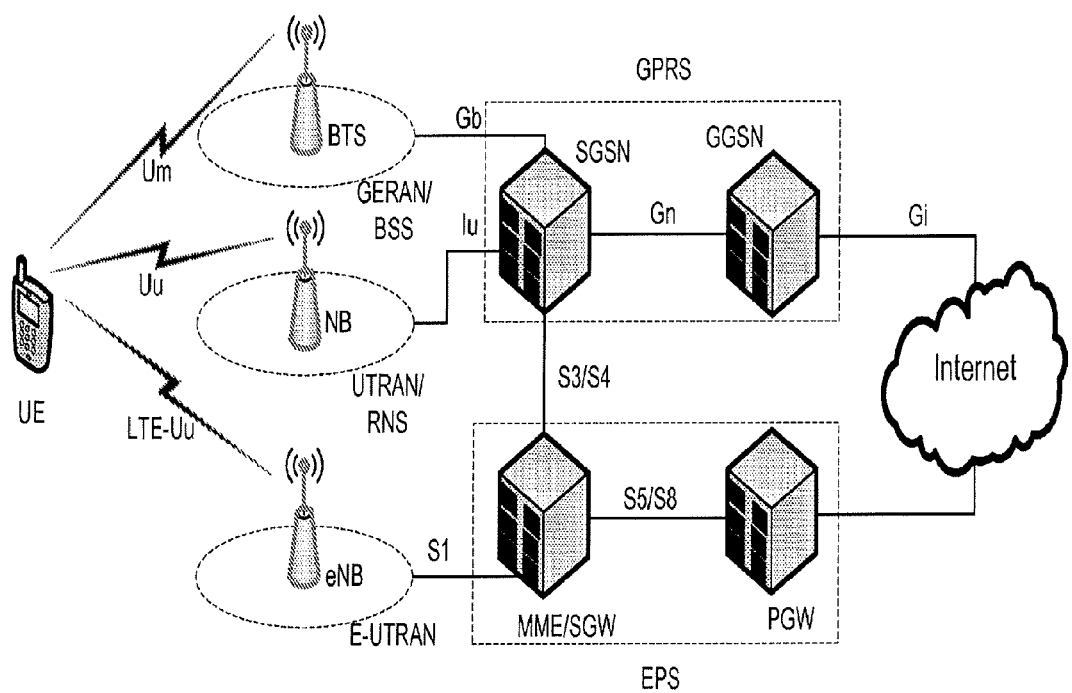
FIG. 1 shows a high-level network diagram illustrating the interworking between a UR supporting multiple radio access technologies (RATs), various types of 3GPP radio access networks, and the packet data communication functionality in 3GPP core networks.

FIG. 1 shows a high-level block diagram illustrating the interworking between a UE supporting multiple radio access technologies (RATs), various types of 3GPP radio access networks, and the packet data communication functionality in 3GPP core networks. The UE shown in FIG. 1 is capable of communicating with a GERAN, which comprises one or more BTSs, over the Um interface; with a UTRAN, which comprises one or more NBs, over the Uu interface; and with an E-UTRAN, which comprises one or more eNBs, over the LTE-Uu interface. The GERAN is also commonly known as a Base Station Subsystem (BSS), while Cite UTRAN is also commonly known as a Radio Network Subsystem (RN5). As shown in FIG. 3, the GERAN, UTRAN, and E-UTRAN may be under common control of a single network operator. In some cases, however, only one of the GERAN and the UTRAN will be present in an operators network.

All packer data communications from the UE via the GERAN and UTRAN pass through the General Packet Radio Service (GPRS) sub-system. The GPRS sub-system comprises a Serving GPRS Support Node, which connects to the GERAN via the Gb interface and to the UTRAN via the Iu interface. The SGSN is responsible for routing of packets to/from the UE, and for mobility and data connection management with respect to the UE. The GPRS sub-system also comprises the Gateway GPRS Support Node (GGSN), which connects to the SGSN via the Gn interface and to external packet data networks (e.g. the Internet) via the Gi interface. The combination of SGSN, GGSN and related protocols that provide the interface between the UE and external packet data networks are commonly known as the "packet-switched domain" or "PS domain".

Although not shown in FIG. 1, all communications (e.g. voice calls) from the UE via the GERAN and UTRAN to external circuit-switched networks (e.g. a public telephone network) pass through a Mobile Switching Center (MSC). Like the SGSN, the MSC communicates with the RNS via the Iu interface. The MSC is often combined or co-located with a Visitor Location Register (VLR), which retrieves and stores information for handling of calls to or from UEs located within the MSC's service area that are roaming from outside its area. The MSC/VLR communicates with a Home Location Register (HLR) from the UE's home service area for these purposes. The combination of MSC, VLR and related protocols that provide the interface between the UE and external circuit-switched networks are commonly known as the "circuit-switched domain" or "CS domain".

The combination of the PS domain and CS domain is commonly referred to as the "core network".

Similarly, all packet data communications from the UE via the E-UTRAN pass through the Evolved Packet Subsystem (EPS) or Evolved Packet Core (EPC). The EPS comprises the Serving Gateway (SGW) and Mobility Management Entity (MME), Which connect to the E-UTRAN via the S1 interface. To allow packet data interworking for a UE across multiple types of access networks, the MME and SGW connect to the SGSN via the S3 and S4 interfaces, respectively. The EPS also comprises the Packet Data Gateway (PGW), which provides a gateway from the EPS to external packet data networks (e.g., the Internet). The PGW connects to the SGW via the S5 and S8 interfaces, as shown in FIG. 1.

Figure 2A:
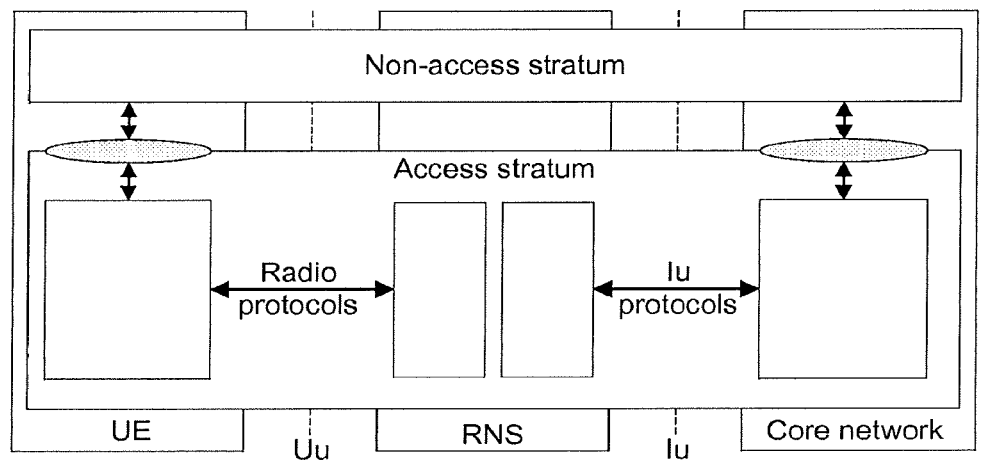
FIG. 2A shows a high-level block diagram of the UTRAN architecture in terms of its constituent components, protocol, and interfaces.

FIG. 2A is a high-level block diagram of UMTS architecture in terms of its constituent entities, namely UE, UTRAN, and Core network, and high-level functional division into the Access Stratum (AS) and the Non-Access Stratum (NAS). FIG. 2A also illustrates two particular interface points, namely Uu (UE/UTRAN Radio Interface) and Iu (UTRAN/Core interface), each using a specific set of protocols, i.e. Radio Protocols and S1 Protocols. Each of the two protocols can be further segmented into user plane (or "U-plane") and control plane (or "C-plane") protocol functionality. On the Uu interface, the U-plane carries user information (e.g. data packets) while the C-plane carries control information between UE and UTRAN.

Figure 2B:
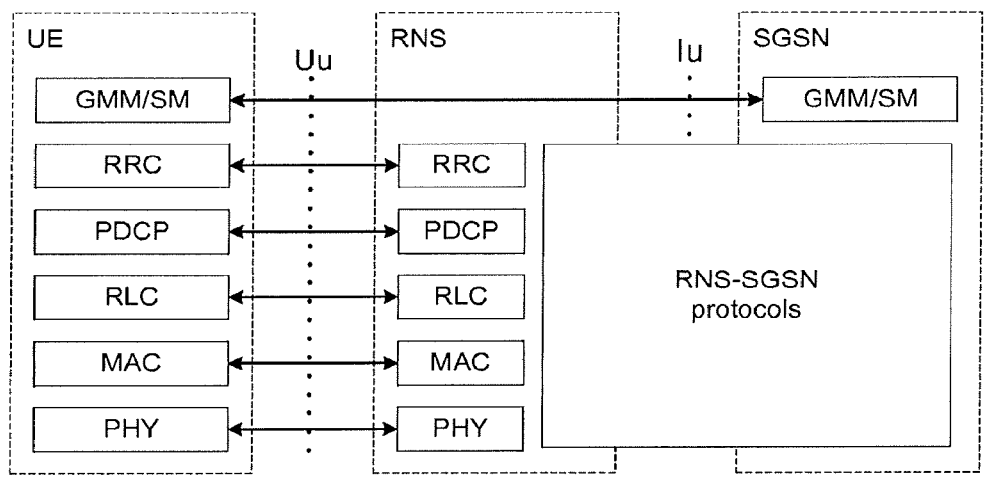
FIG. 2B shows a block diagram of the protocol layers of the control-plane portion of the radio interface (Uu) between a user equipment (UE), the UTRAN, and the Serving GPRS Support Node (SGSN)

FIG. 2B is a block diagram of the C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the UNITS radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

The RRC layer provides a variety of C-plane services including broadcast of system information (SI); paging; security key management; and establishment, maintenance, and release of connections between a UE and a UTRAN. The RRC System Information (SI) messages are transmitted by the NBs on their respective BCCH logical channels, and comprise a Master Information Block (MIB) and a number of System Information Blocks (SIBs). The MIB includes a limited number of most essential and most frequently transmitted parameters that are needed to acquire other information related to the cell, which is contained in the SIBS. For example, SystemInformationBlockType1 (SIB1) contains information used by a UE to evaluate whether it is allowed to access a cell and defines the scheduling of other system information blocks.

SystemInformationBlock3 (SIB3) contains information related to Access Class Barring (ACB), Domain Specific Access Control (DSAC) and Paging Permission with Access Control (PPAC). When external disasters (e.g. earthquakes) or unusual events affect a large area, voice calls are likely to increase greatly, which causes congestion and overload to the MSC/VLR serving the affected area. While some overload situations can be handled by the MSC rejecting call attempts, more severe overload situations need to be handled without impact on the MSC. In these situations, the operator can cause the BSS (GERAN) and RNS (UTRAN) to bar certain classes of users from accessing the network. The ACB information broadcast in SIB3 comprises individual settings for sixteen (16) different access classes. The setting for each class either permits or bars all UEs of that class from making any type of access to the network, including registration, responding to pages from the network, and origination of a connection. The ACB information is always provided in SIB3 and applies when DSAC and/or PPAC is not provided.

Experience in actual networks has shown that congestion is more likely to occur in one domain only (e.g. circuit-switched domain for voice calls). DSAC addresses this imbalance by providing a mechanism for restricting access to each of the packet- and circuit-switched domains in the network independently of the other domain. The DSAC information broadcast in SIB3 comprises both PS and CS domain settings for each of sixteen (16) different access classes. When broadcast without PPAC, the DSAC setting for each particular class-domain combination either permits or bars all UEs of that particular class from making any type of access to that particular domain of the network.

PPAC provides additional control over congestion by allowing UEs with indications from the network to perform location registration and respond to a paging request even under access class barring conditions. This feature can be used, for example, to allow authorised persons (e.g. police, fire, ambulance, and utility personnel) to receive calls with further information, instructions, directions, etc. necessary for correct and timely response to an emergency. The PPAC information broadcast in SIB3 comprises an indication of whether registration is barred in the CS domain, the PS domain, or both. In case registration is barred in at least one domain, PPAC also includes an individual barring setting for 15 of the 16 access classed (i.e. classes 0-9 and 11-15). The PPAC information broadcast in SIB3 also comprises an indication of whether paging responses are barred in the CS domain, the PS domain, or both. If paging response is barred in a particular domain, the DSAC access class settings for that particular domain determine which of the 16 access classes are barred from responding to pages in that domain. If DSAC information is not included in SIB3, then ACB class settings determine which of the 16 access classes are barred from responding to pages in that domain(s).

After the UE receives and processes these SI messages, it may attempt to establish a connection with the UTRAN via its serving NB, e.g. for sending data packets. When a UE desires to establish a connection to the UTRAN, it sends an RRC RRCConnectionRequest message to its serving RNC. The RNC responds to the RRCConnectionRequest message with an RRC RRCConnectionSetup message which includes information about the radio resources assigned by the serving RNC for the requested connection. After configuring its radio resources in accordance with this assignment, and performing various other tasks, the UE responds to the RNC by sending an RRC RRCConnectionSetupComplete message which confirms the establishment of the connection. Upon establishing an RRC connection, the UE transitions from "idle" mode to "connected" mode, specifically to the CELL_DCH state.

After establishing the RRC connection, the UE may perform various other control-plane procedures to enable and support communication of user-plane data. Referring again to FIG. 2A, the NAS protocols between the UE and the core network include GPRS mobility management and session management (GMM/SM) procedures between the UE and the SGSN, as shown in FIG. 2B. These procedures support user mobility management and user content management. For example, the SGSN creates a UE context when a UE is turned on and attaches to the network. In such case, the SGSN assigns a unique short temporary identity called the Temporary Mobile Subscriber Identity (TMSI) to the UE that identifies the UE content in the SGSN. This UE context holds user subscription information downloaded from the Home Subscriber Server (HSS) in the user's home network. The HSS subscription information includes the quality-of-service (QoS) profile, any access restrictions for roaming, and information about the packet data networks (PDNs) to which the user may connect. The local storage of subscription data in the SGSN allows faster execution of procedures such as bearer establishment since it removes the need for the SGSN to consult the user's HSS every time. In addition to the HSS information, the UE context also contains dynamic information such as the list of bearers that are currently established and the UE's terminal capabilities.

One specific GMM procedure is "attach", which is used by the UE to initiate GPRS services via the GERAN or UTRAN and to establish a GMM context and a default bearer. In the case the UE wishes to attach for both GPRS and non-GPRS services (e.g. circuit-switched services such as voice), the UE will initiate a "Combined attach" procedure. Similarly, if the UE wishes to terminate GPRS services in the network, it initiates a "detach" procedure or a "combined detach" procedure for terminating both GPRS and non-GPRS services. Both "detach" procedures also remove the UE's GMM context including releasing all established bearers.

To reduce the processing in the UTRAN and the UE, all UE-related information, including the radio bearers, can be released by the UTRAN during long periods of data inactivity. During these periods, the SGSN retains the still-attached UE's context and the information about the established bearers while placing the UE in PMM-Idle state. To allow the network to contact it as needed, a UE updates the network as to its new location whenever it moves out of its current routing area (RA), which uniquely identifies the coverage area of a group of base stations (e.g. NBs) in the UTRAN. This update procedure is called a RA update (RAU). The SGSN is responsible for keeping track of the location of the attached UE. When there is a need to deliver downlink packet data to an attached UE, the SGSN sends a paging message to all the NBs in its current RA, and the NBs page the UE over the radio interface. On receipt of a paging message, the UE performs a Service Request procedure, which causes the SGSN to update the UE-related context information and re-establish the UTRAN radio bearers. This causes the UE to transition from PMM-Idle to PMM-Connected state with respect to the SGSN.

Both GERAN and UTRAN also include the concept of a "location area" (LA), which uniquely identifies a group of base stations with respect to non-GPRS services (e.g. circuit-switched services). When there is a need to deliver an incoming voice call to an idle UE, the network sends a paging message to all the NBs in its current LA, and the NBs page the UE over the radio interface. A UE performs a "location area update" (LAU) procedure upon the occurrence of various conditions similar to those that trigger a RAU. Devices attached via a GERAN or UTRAN for both GPRS and non-GPRS (e.g. voice) services may need to perform both an LAU and a RAU, which is known as a "combined RAU".

Figure 3A:
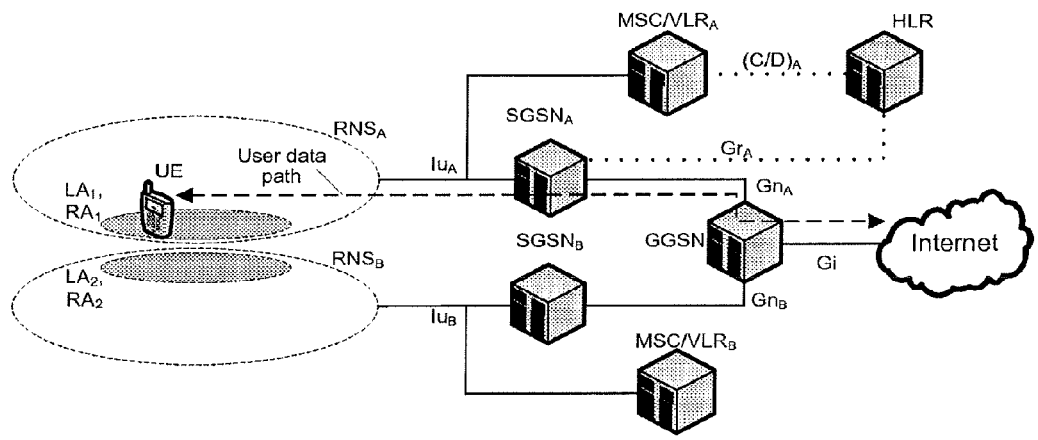
FIGS. 3A, 3B, and 3C show high-level network diagrams illustrating the process of inter-SGSN relocation of a UE's serving UTRAN or radio network subsystem (SRNS)
Figure 3B:
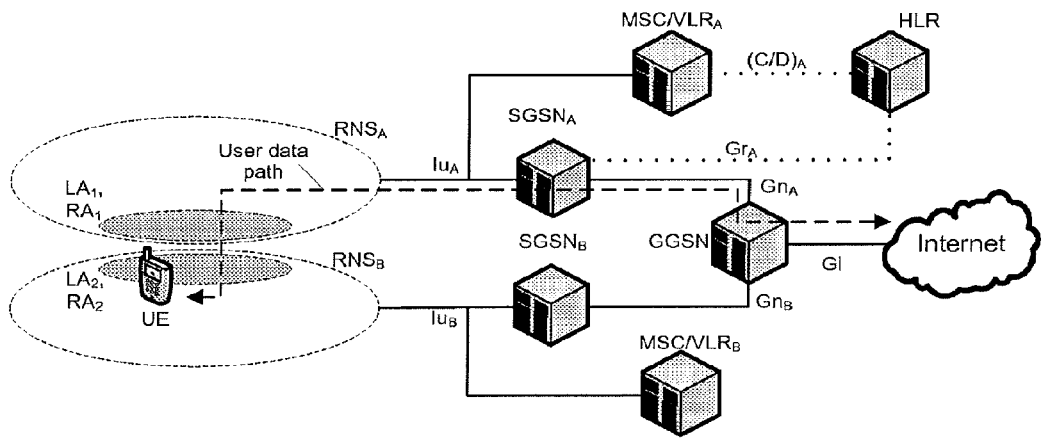
Figure 3C:
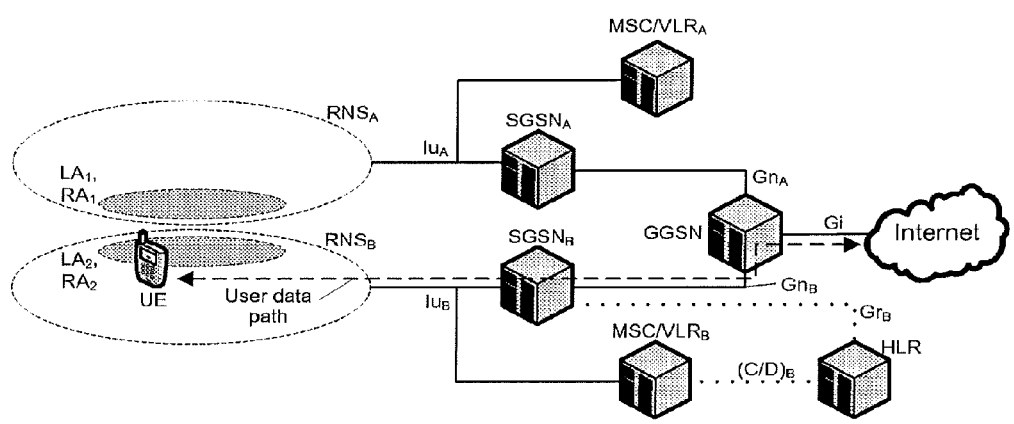

Since each UTRAN (or RNS) may include many different RAs and LAs, RAU procedures often take place when a UE moves between cells within a single RNS. In some cases, however, a UE will move into a new cell that is part of a different RNS. In such case, the network must perform a procedure known as a serving RNS (SRNS) relocation. SRNS relocation is used to move the RNS-to-core network connection point (i.e. the Iu interface links) from the RNS comprising the UE's previous LA and RA to the RNS comprising the UE's current LA and RA (i.e. the current serving RNS). This is illustrated by FIGS. 3A-C. Each of these figures shows a network comprising UTRANs $RNS_A$ and $RNS_B$ which are connected to $SGSN_A$ and $SGSN_B$ via interfaces $Iu_A$ and $Iu_B$, respectively. $SGSN_A$ and $SGSN_B$ are connected via interfaces $Gn_A$ and $Gn_B$, respectively, to a single GGSN, which is connected to the Internet via interface Gi. In addition, interfaces $Iu_A$ and $Iu_B$ also connect $RNS_A$ and $RNS_B$ to $MSC/VLR_A$ and $MSC/VLR_B$, respectively.

In FIG. 3A, a UE is operating in location area $LA_1$ and routing area $RA_1$ of serving $RNS_A$. The UE has established and is utilising a user-plane packet data path via interface $Iu_A$ to $SGSN_A$, interface $Gr_A$ to GGSN, and interface Gi to the Internet. Although not shown, the UE's circuit-domain data path is via serving $MSC/VLR_A$. Accordingly, the HLR of the UE's home network is in communication with serving $SGSN_A$ and serving $MSC/VLR_A$ via the $(C/D)_A$ and $Gr_A$ interfaces, respectively, as indicated by the dotted lines.

Subsequently, the UE moves from a cell within $RNS_A$, which is part of location area $LA_1$ and routing area $RA_1$, into a cell within $RNS_D$, which is part of location area $LA_2$ and routing area $RA_2$. This is illustrated in FIG. 3B. In this scenario, even though the UE is communicating via the radio bearers of $RNS_B$, the UE's serving RNS is still $RNS_A$, the UE's serving SGSN is still $SGSN_A$, and its serving MSC/VLR is still $MSC/VLR_A$. As such, the UE's user-plane data path runs first from $RNS_B$ to $RNS_A$, and then via serving $SGSN_A$ and GGSN to the Internet or via serving $MSC/VLR_A$ to external circuit-switched networks. As such, the UE's HLR is still in communication with $SGSN_A$ and $MSC/VLR_A$ as indicated by the dotted lines.

The UE's serving RNS (i.e. $RNS_A$) eventually determines that an SRNS relocation is required for the UE. By SRNS relocation, the UTRAN can transfer a UE's active RRC connection from one RNS ("source RNS") to another ("target RNS"). If the UE enters a cell that is not controlled by its Current Serving RNS, the UE sends either an RRC CellUpdate or an RRC user registration area update (URA Update) message depending on the network configuration. Based on this message, the serving RNS may trigger the SRNS relocation procedure, which changes the RRC connection from the current SRNS (source RNS) to the target RNS, which will become the UE's SRNS after a successful SRNS relocation. During the procedure, all necessary RRC signalling information and all ongoing user-plane data paths will be transferred to the target RNS. In case the target RNS is connected to a different SGSN than the source RNS, the RNS-SGSN connection (Iu interface) also will be transferred during SNRS relocation ("inter-SGSN SRNS relocation"). Likewise, if the source and target RNSs are connected to different MSC/VLRs, the RN5-MSC/VLR Iu interface also will be transferred during SRNS relocation. The UE'S RA and LA also will be updated, if necessary, during SRNS relocation.

In the scenario shown in FIG. 3C, source $RNS_A$ initiates the SNRS relocation for the UE to target $RNS_B$. Since the UE's source and target RNSs are connected to different SGSNs in this scenario, the intra-SGSN SRNS relocation also involves changing the Iu interface supporting the UE from $Iu_A$ between $RNS_A$ and $SGSN_A$ to $Iu_B$ between $RNS_B$ and $SGSN_B$. As shown in FIG. 3C, after successful relocation, the UE's user-plane data path runs from $RNS_B$ via serving $SGSN_D$ and GGSN to the Internet. Moreover, since the UE's source and larger RNSs are connected to different MSC/VLRs in this scenario, the SRNS relocation also involves changing the Iu interface supporting the UE from $Iu_A$ between $RNS_A$ and $MSC/VLR_A$ to $Iu_B$ between $RNS_B$ and $MSC/VLR_B$. After successful relocation, the UE's is capable of connecting to external circuit-switched networks via $RNS_B$ and $MSC/VLR_B$. During the relocation procedure, the UE also updates is location and routing areas from $LA_1$ and $RA_1$, respectively, to $LA_2$ and $RA_2$ using appropriate GMM/SM procedures known to persons of ordinary skill in the art.

Although establishing an RRC connection is a prerequisite for transmitting user-plane data and performing the various control-plane procedures described above, once the UE transitions from RRC "idle" mode CELL_DCH state within RRC "connected" mode, it is no longer required to receive the S1 messages broadcast by its serving NB. As such, the UE may not be able to determine when certain information that is provided only in the broadcast SIBs has changed or has been updated. This may cause UEs operating in RRC CELL_DCH state, such as UEs with active user-plane data paths operating in PMM-Connected state with respect to the SGSN, to miss updates to important information contained in the SIBS broadcast by their serving RNS. Moreover, when UEs in RRC CELL_DCH state change serving RNS (SRNS), e.g. during SRNS relocation, they do not receive the system information broadcast by the new SRNS. As such, these UEs may continue to operate as configured by the system information broadcast by their previous SRNS, which may be incompatible in one or more ways with their new SRNS.

A particular example of this problem involves the DSAC and PPAC access class control information provided only in broadcast SIB3, which is not received by UEs operating in RRC "connected" mode (e.g. CELL_DCH state). According to the 3GPP Technical Specification (TS) 25.331, upon transitioning to RRC "connected" mode, UEs must store the latest DSAC and PPAC values received in SIB3 and maintain them until they are cleared, the PLMN chosen by the UE is changed, or the UE's RRC connection is released. As such, UEs in RRC "connected" mode are unable to determine access class barring changes due to underlying changes in network congestion. This includes access class baring changes due to congestion changes affecting a single RNS and access class barring differences between multiple RNS, due to differing congestion conditions therein.

Figure 4:
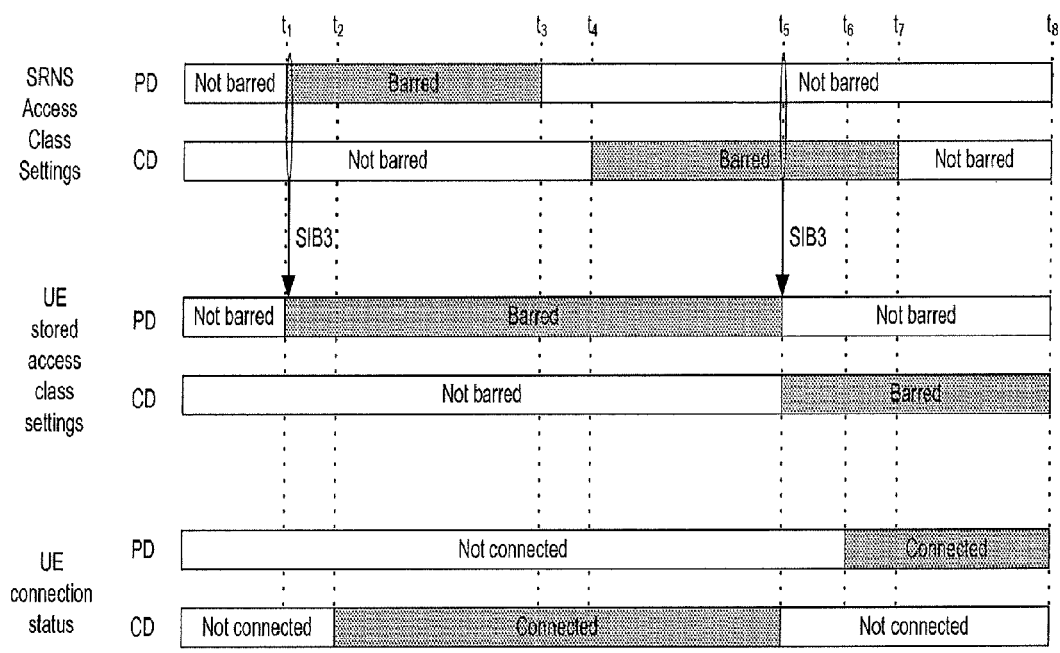
FIG. 4 shows a timing diagram illustrating how changes in access control (AC) information broadcast by a UE'S SRNS affects the UE's ability to establish packet- and circuit-domain connections.

This may result in both over- and under-utilisation of network resources by each UE, as shown by the timing diagram of FIG. 4 which illustrates how changes in access control (AC) information broadcast by a UE's SRNS affect the UE's ability to establish packet- and circuit-domain connections. Each of the six horizontal lines represent the value of a particular parameter or value over time, which is increasing from left to right in the figure. The first two lines represent the barring status in the UE's SRNS for the access class associated with the UE, with the first line representing the barring status ("barred" or "not barred") for packet-switched (PS) domain connections and the second line representing the barring status for circuit switched (CS) domain connections. These barring status values are broadcast by the RNS to all UEs within its service area, e.g. in SIB3. The third and fourth lines represent the UE's stored PS and CS domain barring settings, respectively, while the fifth and sixth lines represent the status of the UE's PS and CS domain connections, e.g. "connected" or "not connected". For example, a PS domain status of "connected" may correspond to the UE being in PMM-Connected state with respect to its SGSN.

Initially, the SRNS broadcasts DSAC/PPAC values indicating that the UE is not barred from establishing PS or CS domain connections. At time $t_1$, however, the SRNS updates these status values to indicate that PS domain connections are barred while CS domain connections are not barred. This may occur, for example, if the SGSN connected to the SRNS is overloaded with packet data traffic. The UE, which is not connected in either domain, receives this updated access class barring information via broadcast SIB3 at $t_1$ or soon thereafter, according to the schedule at which it receives SRNS broadcast information. The UE stores this updated barring information as required.

At time $t_2$, based on the stored CS domain status of "not barred", the UE establishes a CS domain connection via the SRNS. In some cases, the UE also may desire to establish a PS domain connection at the same time, but is unable to do so due to its stored PS domain barring status value. At time $t_3$, the SRNS updates the broadcast DSAC/PPAC values in SIB3 to remove the PS domain barring, such that the UE is no longer barred from establishing PS domain or CS domain connections. This update may occur, for example, if the previous SGSN congestion has ceased. Because it does not receive the broadcast SIB3 while "connected", the UE is not aware of this update until time $t_5$, when it releases the CS domain connection established at $t_2$ and is able to receive broadcast SIB3 again. Accordingly, the UE is unable to establish a PS domain connection between $t_3$ and $t_5$, even though it is allowed to do so by the SRNS.

Meanwhile, at time $t_4$, where $t_3$-$t_4$<$t_5$, the SRNS updates these DSAC/PPAC status values to indicate that CS domain connections are barred while PS domain connections are not barred. This may occur, for example, if the MSC/VLR connected to the SRNS is overloaded with circuit voice calls, e.g. during an emergency condition. Because it does not receive the broadcast SIB3 while "connected", the UE is not aware of this update until time $t_5$, when it releases the CS domain connection established at $t_2$ and is able to receive broadcast SIB3 again. Accordingly, during the period between $t_4$ and $t_5$, the UE continues to utilise the congested CS domain resources even though the congested condition has been indicated by the change in DSAC/PPAC barring values broadcast by the SRNS in SIB3.

At time $t_5$, the UE terminates its CS domain connection. Since it no longer is connected in either domain, the UE receives the current access class barring information via broadcast SIB3 at $t_5$ or soon thereafter, according to the schedule at which it receives SRNS broadcast information. The UE stores this updated barring information as required. At time $t_6$, based on the stored PS domain status of "not barred", the UE establishes a PS domain connection via the SRNS. In some cases, the UE also may desire to establish a CS domain connection at the same time, but is unable to do so due to its stored CS domain barring status value.

At time $t_7$, the SRNS updates the broadcast DSAC/PPAC values in SIB3 to remove the CS domain barring, such that the UE is no longer barred from establishing PS or CS domain connections. This update may occur, for example, if the previous MSC/VLR congestion has ceased. Because it does not receive the broadcast SIB3 while "connected", the UE does not become aware of this update until such time that it releases the PS domain connection established at $t_8$ and is able to receive broadcast SIB3 again. Accordingly, the UE is unable to establish a CS domain connection between $t_7$ and $t_8$, even though it is allowed to do so by the SRNS.

Although FIG. 4 is described above in terms of the UE's interactions with a single SRNS, persons of ordinary skill will recognise that the timeline of FIG. 4 is applicable to a sequence of events including one or more SRNS relocations. In other words, each of the changes in SRNS access class settings that occur at times $t_1$, $t_3$, $t_4$, and $t_7$ may be due either to congestion changes affecting a single SRNS (as described above) or to an SRNS relocation procedure in which the target RNS has different access class settings than the source SRNS. In the case of SRNS relocation, the UE maintains the stored DSAC/PPAC values from its previous (source) SRNS until they are cleared, the PLMN chosen by the UE is changed, or the UE's RRC connection is released. If the UE's target SRNS has different congestion conditions and, consequently, different DSAC/PPAC settings than the source SRNS, the inability of the UE to update these settings upon SRNS relocation may cause it to over- or under-utilise resources associated with the target SRNS, as explained above.

Embodiments of the present disclosure solve these and other problems by providing methods for a communication device (e.g. a UE or a component of a UE) to communicate via a plurality of networks subject to access controls, comprising receiving access control information from a first network, wherein said first network is the device's serving network; storing the received access control information as a plurality of access control settings; establishing a first connection via the serving network based on one or more of the access control settings; determining that the device's serving network has changed from the first network to a second network; and replacing at least a portion of the plurality of access control settings with corresponding default access control settings. In some embodiments, the access control settings comprise one or more packed-switched (PS) domain access control settings and one or more circuit-switched (CS) domain access control settings. In some embodiments, the access control information comprises at least one of Domain Specific Access Control (DSAC) information and Paging Permission with Access Control (PPAC) information. In some embodiments, the default access control settings comprise access class barring (ACB) information.

In some embodiments, the method further comprises establishing a second connection via the second network based on one or more of the access control settings, wherein at least one of the access control settings used to establish the second connection is different from the access control settings used to establish the first connection. In some embodiments, one of the first and second connections comprises a packet-switched (PS) domain connection and the other of the first and second connections is a circuit-switched (CS) domain connection, and each of the first and second connections is established based on an access control setting corresponding to the type of the connection.

In some embodiments, the first and the second networks each comprises a radio network subsystem (RNS), establishing the first connection comprises establishing a Radio Resource Control (RRC) connection, the received access control information comprises system information broadcast by the first RNS, and determining that the device's serving network has changed from the first network to the second network comprises receiving an RRC message associated with a serving RNS (SRNS) relocation procedure. Embodiments include devices, apparatus, and computer-readable media embodying one or more of the above methods.

Figure 5:
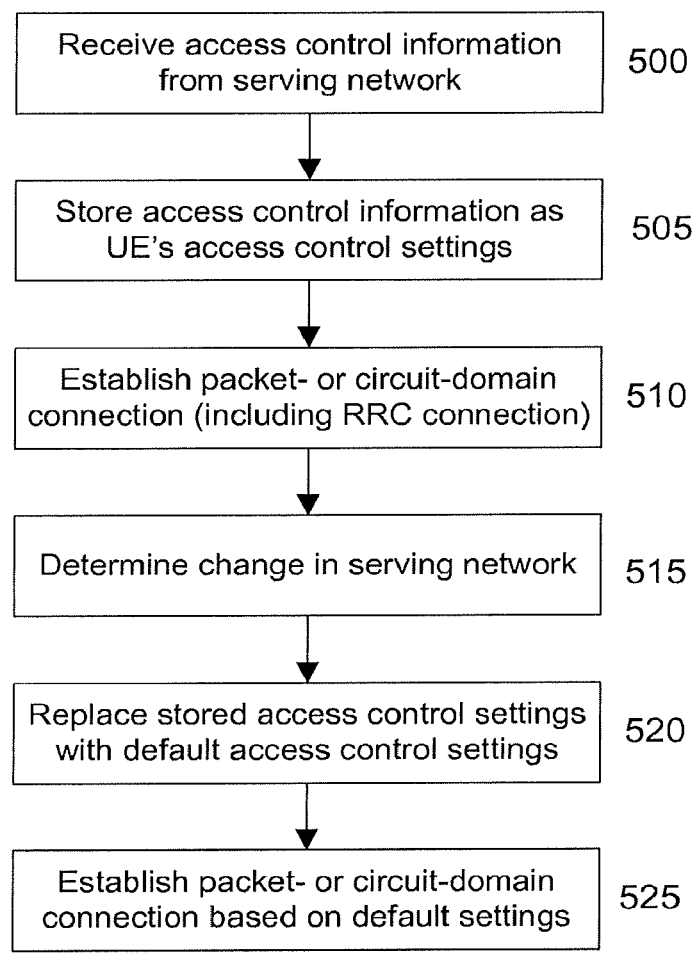
FIG. 5 shows a flowchart of an exemplary method in an apparatus, such as a UE or component of a UE, according to one or more embodiments of the present disclosure.

FIG. 5 is a flowchart of an exemplary method for a communication device (e.g. a UE or component of a UE) to communicate with a plurality of communication networks subject to access controls, according to one or more embodiments of the present disclosure. In some embodiments, the plurality of networks comprise a plurality of radio network subsystems (RNS), such as RNS associated with a UMTS network. In some embodiments, the plurality of RNS are further connected to one or more SGSNs, such that the device can establish PS domain connections via the plurality of RNS and the one or more SGSNs. In some embodiments, the plurality of RNS are further connected to one or more MSC/VLRs (referred to as MSCs hereinafter), such that the device can establish CS domain connections via the plurality of RNS and the one or more MSCs. Although the method is illustrated by blocks in the particular order shown in FIG. 5, this order is merely exemplary and the steps may be performed in different orders and may be combined and/or divided into blocks having different functionality than shown in FIG. 5.

In block 500, the device receives access control information from its serving network, e.g. its serving RNS (SRNS). In some embodiments, the access control information comprises system information broadcast by the SRNS, e.g. in one or more SIBS such as SIB3. In some embodiments, the received access control information may comprise one or more access control settings associated with each of a plurality of access classes. In some embodiments, the access control information comprises one or more PS domain access control settings and one or more CS domain access control settings. In some embodiments, the received access control information may comprise one or more access control settings associated with both the CS domain and the PS domain. In some embodiments, the access control information may comprise information indicating whether origination of a connection is barred in a particular domain (e.g. DSAC information). In some embodiments, the received access control information may comprise information indicating whether performing a registration is barred in a particular domain and whether responding to a request to establish a connection (e.g. page response) is barred in a particular domain (e.g. PPAC information). In some embodiments, the received access control information also may comprise default access control settings associated with at least one of a plurality of access classes, a plurality of domains, and a plurality of access types (e.g. origination, registration, page response). In some embodiments, the default access control settings may comprise access class barring (ACB) information broadcast by the SRNS in, for example, SIB3. In some embodiments, the default access control settings may indicate that each of the plurality of access classes is barred for all types of access in both the PS and CS domains.

In block 505, the device stores the received access control information as its access control settings. The device may store the received access control information in volatile or nonvolatile memory. In embodiments where the received access control information also comprises default access control settings, the device also stores the default access control settings in corresponding memory locations. In block 510, the device establishes one or more connections via its SRNS based on its stored access control settings. For example, the device may establish a CS domain connection if permitted by the CS domain access control settings corresponding to the device's access class. Likewise, the device may establish a PS domain connection if permitted by the PS domain access control settings corresponding to the device's access class. In some embodiments, the device may establish both PS and CS domain connections if permitted by the respective access control settings. In any event, establishing a connection may comprise establishing a Radio Resource Control (RRC) connection such that the device enters CELL_DCH state of RRC "connected" mode. As used herein, the term "establish a connection" comprises initialing a connection, responding to a request to initiate a connection (e.g. a page from the SRNS), and registration.

In block 515, the device determines that a change in its serving network has occurred or is in the process of occurring. In some embodiments, the change in network comprises an SRNS relocation. The device may make this determination based on receiving a message associated with a change in serving network, e.g. an RRC message associated with an SRNS relocation. Exemplary RRC messages associated with an SRNS relocation include, but are not limited to, RadioBearerReconfiguration, RadioBearerSetup, RadioBearerRelease, TransportChannelReconfiguration, PhysicalChannelReconfiguration, CellUpdateConfirm, URAUpdateConfirm, and UTRANMobilityInformation messages.

In block 520, the device replaces one or more of its stored access control settings with one or more default access control settings. In some embodiments, the default access control settings may comprise one or more default access control settings associated with each of a plurality of access classes. In some embodiments, the default access control settings indicate that all of the plurality of access classes are barred for all types of access in both the PS and CS domains. In some embodiments, the default access control settings indicate that all of the plurality of access classes are not barred (i.e. permitted) for all types of access in both the PS and CS domains. In some embodiments, the default access control settings may comprise a plurality of predefined default settings, each associated with a particular access class. These predefined default settings may be stored in the device's memory, e.g. non-volatile memory. In some embodiments, the predefined default setting associated with a particular access class may be further associated with both the PS and CS domains and with all access types (e.g. origination, registration, page response). In some embodiments, the predefined default setting associated with a particular access class may be further associated with at least one of a particular domain and a particular access type.

In some embodiments, the default access control settings may comprise a plurality of default settings received from the device's SRNS prior to establishing the connection in block 510 (e.g. in block 500). In some embodiments, each of these received default settings is associated with a particular access class, with both the PS and CS domains, and with all access types (e.g. origination, registration, page response). In some embodiments, each of these received default settings is associated with a particular access class and at least one of a particular domain and a particular access type. In some embodiments, the default access control settings may comprise one or more settings received from the device's SRNS prior to establishing the connection in block 510, and one or more predefined default settings.

In some embodiments, the received default access control settings comprise the access class barring (ACB) information broadcast in SIB3. In some embodiments, the operation of block 520 comprises deleting at least a portion of the DSAC and PPAC information received in block 500. In such embodiments, after deleting the DSAC and/or PPAC information, the ACB information comprising the received default access control settings may be used as the device's stored access control settings, at least with respect to the deleted portion of the DSAC and PPAC information. For example, if DSAC information was deleted but PPAC was not deleted in the operation of block 520, then subsequently the ACS information may be used with respect to the missing DSAC information.

In block 525, the device establishes at least one of a PS domain and a CS domain connection based on the stored access control settings corresponding to the device's access class. In some embodiments, the operation of block 525 may comprise establishing a second connection (e.g. PS domain connection) in addition to a first connection (e.g. CS domain connection) established in block 510. In some embodiments, the operation of block 525 may comprise establishing a first connection if the connection established in block 510 no longer exists, e.g. it has been disconnected. In any event, the connection established in block 525 is established only if permitted by the access control setting corresponding to the device's access class and the domain and type (e.g. origination, registration, page response) of the connection to be established.

Figure 6:
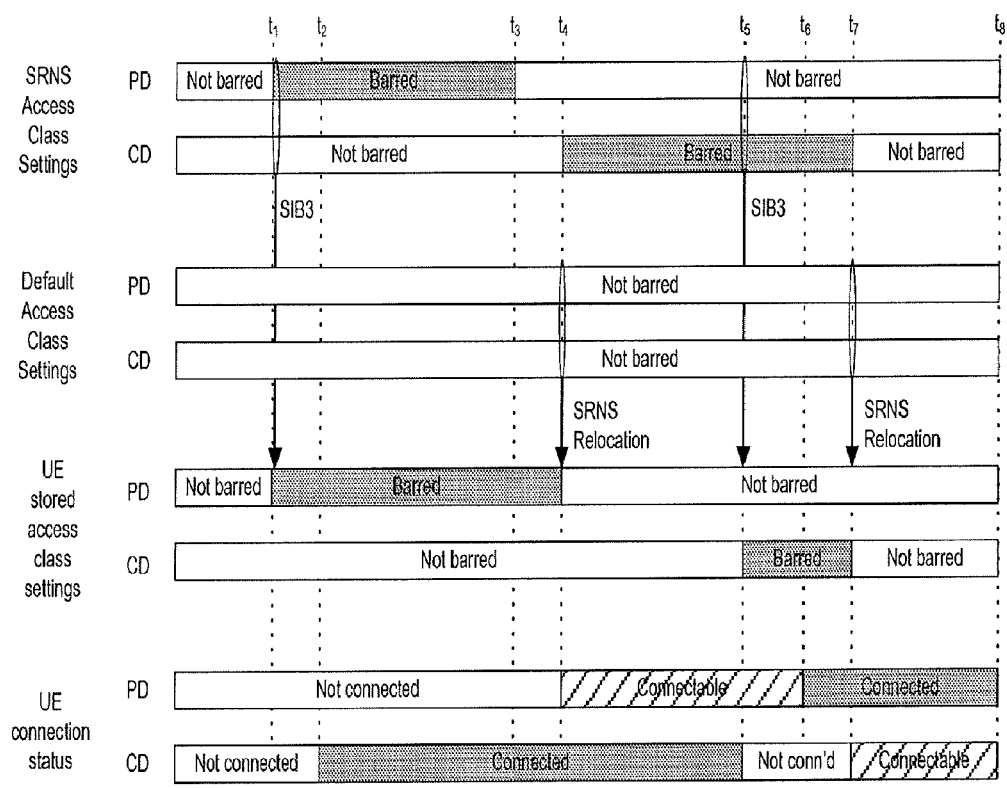
FIG. 6 shows a timing diagram illustrating an example of how changes in access control (AC) information broadcast by a UE's SRNS affects the UE's ability to establish packet- and circuit-domain connections, according to one or more embodiments of the present disclosure.

FIG. 6 is an exemplary timing diagram that illustrates the operation of the method shown in FIG. 5. In contrast to FIG. 4, FIG. 6 illustrates how changes in access control (AC) information broadcast by a UE's SRNS affects the UE's ability to establish packet- and circuit-domain connections when the UE utilises the method shown in FIG. 5. Each of the eight horizontal lines represent the value of a particular parameter or value overtime, which is increasing from left to right in the figure. The first two lines represent the packet-switched (PS) domain and circuit-switched (CS) domain barring status, respectively, in the UE's SRNS for the access class associated with the UE. These barring status values are broadcast by the RNS to all UEs within its service area, e.g. in SIB3. The third and fourth lines represent the default PS and CS domain barring settings, respectively, used by the UE. As discussed above, the default settings may be fixed in the UE's non-volatile memory or the UE may obtain them from the system information broadcast by its serving RNS, e.g. in SIB3. The fifth and sixth lines represent the UE's stored PS and CS domain barring settings, respectively, while the seventh and eighth lines represent the status of the UE's PS and CS domain connections, respectively. In addition to "connected" and "not connected" states shown in FIG. 4, a third state, "connectable", is used in FIG. 6 to indicate periods during which the UE may attempt to establish a particular type of connection (e.g. PS domain) based on its updated stored barring settings.

As shown in FIG. 6, the UE's default barring settings permit the UE to establish a connection in both domains. Persons of ordinary skill will understand that these particular settings are merely exemplary, and other default barring settings may be used (e.g. both domains barred). The UE's SRNS also initially broadcasts DSAC/PPAC values indicating that the UE is not barred from establishing PS or CS domain connections. At time $t_1$, however, the SRNS updates these status values to indicate that PS domain connections are barred while CS domain connections are not barred. This may occur, for example, if the SGSN connected to the SRNS is overloaded with packet data traffic. The UE, which is not connected in either domain, receives this updated access class barring information via broadcast SIB3 at $t_1$ or soon thereafter, according to the schedule at which it receives SRNS broadcast information. The UE stores this updated barring information to use as its barring settings.

At time $t_2$, based on the stored CS domain setting of "not barred", the UE establishes a CS domain connection via the SRNS. In some cases, the UE also may desire to establish a PS domain connection at the same time, but is unable to do so due to its stored PS domain barring setting. At time $t_3$, the SRNS updates the broadcast DSAC/PPAC values in SIB3 to remove the PS domain barring, such that the UE is no longer barred from establishing PS or CS domain connections. This update may occur, for example, if the previous SGSN congestion has ceased. Because it does not receive the broadcast SIB3 while "connected", the UE is not aware of this update.

Meanwhile, at time $t_4$, where $t_3 < t_4 < t_5$, the UE changes serving RNS via an SRNS relocation procedure. As shown in FIG. 6, the UE's new (target) SRNS broadcasts different DSAC/PPAC status values than the UE's previous (source) SRNS. In particular, the target SRNS broadcasts DSAC/PPAC values in SIB3 indicating that CS domain connections are barred while PS domain connections are not barred. Since the UE is still "connected" in the CS domain, it does not receive these updated DSAC/PPAC values broadcast by its new SRNS. In conjunction with the SRNS relocation procedure, however, the UE updates its stored access class settings with the default values at time $t_4$ or soon thereafter. Since the UE's stored PS domain barring setting has changed to "not barred", the UE becomes "connectable" at time $t_4$ with respect to the PS domain such that the UE may attempt to establish a PS domain connection if desired by the user. The SGSN may not complete the attempted connection, however, if the PS domain congestion is too great at that instant. Also, since the UE's stored CS domain barring setting remains "not barred", it continues to utilise its CS domain connection even though the congested CS domain condition in the new SRNS is indicated by the change in the broadcast DSAC/PPAC barring values.

At time $t_5$, the UE terminates its CS domain connection. Since it no longer is connected in either domain, the UE receives the current access class barring information from its current SRNS via broadcast SIB3 at $t_5$ or soon thereafter, according to the schedule at which it receives SRNS broadcast information. The UE updates its stored access class settings with the received barring information, such that it remains not barred (but connectable) in the PS domain but is barred (and not connected) in the CS domain. At time $t_6$, based on the stored PS domain status of "not barred", the UE establishes a PS domain connection via the SRNS. In some cases, the UE also may desire to establish a CS domain connection at the same time, but is unable to do so due to its stored CS domain barring status value.

At time $t_7$, the UE changes serving RNS via an SRNS relocation procedure. As shown in FIG. 6, the UE's new (target) SRNS broadcasts different DSAC/PPAC status values than the UE'S previous (source) SRNS. In particular, the target SRNS broadcasts DSAC/PPAC values in SIB3 indicating that neither CS nor PS domain connections are barred. Since the UE is still "connected" in the CS domain, it does not receive these updated DSAC/PPAC values broadcast by its new SRNS. In conjunction with the SRNS relocation procedure, however, the UE updates its stored access class settings with the default values at time $t_7$ or soon thereafter. Since the UE's stored CS domain barring setting has changed to "not barred", the UE becomes "connectable" at time $t_4$ with respect to the CS domain, meaning that UE may establish a CS domain connection if desired by the user.

Also, since the UE's stored PS domain barring setting remains "not barred", it continues to utilise its PS domain connection.

Figure 7:
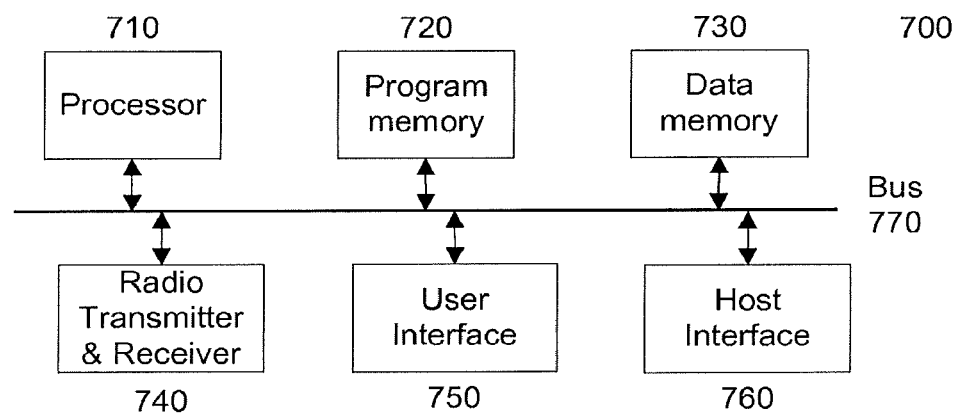
FIG. 7 shows a block diagram of an exemplary apparatus, such as a user equipment or portion thereof, according to one or more embodiments of the present disclosure.

FIG. 7 is a block diagram of an exemplary wireless communication device or apparatus, such as a user equipment (UE) or component or subset of a UE (e.g. modem), utilising certain embodiments of the present disclosure, including one or more of the methods described above with reference to FIGS. 5 and 6. Device 700 comprises processor 710 which is operably connected to program memory 720 and data memory 730 via bus 770, which may comprise parallel address and data buses, serial ports, or other methods and/or structures known to those of ordinary skill in the art. Program memory 720 comprises software code executed by processor 710 that enables device 700 to communicate with one or more other devices using protocols according to various embodiments of the present disclosure, including the UMTS PHY, MAC, RLC, PDCP, RRC, and GMM/SM layer protocols standardised by 3GPP, or any improvements thereto, including those described above with reference to FIGS. 1 through 6.

In some embodiments, program memory 720 also comprises software code executed by processor 710 that enables device 700 to communicate with one or more other devices using other protocols or protocol layers, such as LTE, HSPA, GSM, GPRS, EDGE, and/or CDMA2000 protocols; Internet protocols such as IP, TGP, UDP, or others known to persons of ordinary skill in the art; or any other protocols utilised in conjunction with radio transceiver 740, user interface 750, and/or host interface 760. Program memory 720 further comprises software code executed by processor 710 to control the functions of device 700, including configuring and controlling various components such as radio transceiver 740, user interface 750, and/or host interface 760. Such software code may be specified or written using any known or future developed programming language, such as e.g. Java, C++, C, and Assembler, as long as the desired functionality, e.g. as defined by the implemented method steps, is preserved.

Data memory 730 may comprise memory area for processor 710 to store variables used in protocols, configuration, control, and other functions of device 700. As such, program memory 720 and data memory 730 may comprise non-volatile memory (e.g. flash memory), volatile memory (e.g. static or dynamic RAM), or a combination thereof. Persons of ordinary skill in the art will recognise that processor 710 may comprise multiple individual processors (not shown), each of which implements a portion of the functionality described above. In such case, multiple individual processors may be commonly connected to program memory 720 and data memory 730 or individually connected to multiple individual program memories and or data memories. More generally, persons of ordinary skill in the art will recognise that various protocols and other functions of device 700 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 740 may comprise radio-frequency transmitter and/or receiver functionality that enables device 700 to communicate with other equipment supporting like wireless communication standards. In an exemplary embodiment, radio transceiver 940 includes a UMTS transmitter and receiver that enable device 700 to communicate with various UTRANs (e.g. RNSs) according to standards promulgated by 3GPP. In some embodiments, radio transceiver 740 includes circuitry, firmware, etc. necessary for device 700 to communicate with network equipment using the UMTS protocol layer methods and improvements thereto such as those described above with reference to FIGS. 1 through 6. In some embodiments, radio transceiver 740 includes circuitry, firmware, etc. necessary for device 700 to communicate with various E-UTRANs and GER-ANs. In some embodiments, radio transceiver 740 includes circuitry, firmware, etc. necessary for device 700 to communicate with various CDMA2000 networks.

In some embodiments, radio transceiver 740 is capable of communicating on a plurality of frequency-division-duplex (FDD) frequency bands 1 through 25, as specified in 3GPP standards. In some embodiments, radio transceiver 740 is capable of communicating on a plurality of time-division-duplex (TDD) frequency bands 33 through 43, as specified in 3GPP standards. In some embodiments, radio transceiver 740 is capable of communicating on a combination of these FDD and TDD bands, as well as other bands specified in the 3GPP standards. In some embodiments, radio transceiver 740 is capable of communicating on one or more unlicensed frequency bands, such as the ISM baud in the region of 2.4 GHz. The radio functionality particular to each of these embodiments may be coupled with or controlled by other circuitry in device 700, such as processor 710 executing protocol program code stored in program memory 720.

User interface 750 may take various forms depending on the particular embodiment of apparatus 700. In some embodiments, apparatus 700 is a mobile phone, in which case user interface 750 may comprise one or more of a microphone, a loudspeaker, slidable buttons, depressable buttons, a keypad, a keyboard, a display, a touchscreen display, and/or any other user-interface features commonly found on mobile phones. In some embodiments, apparatus 700 may comprise a tablet device, in which case user interface 750 may be primarily, but not strictly limited to, a touchscreen display. In other embodiments, apparatus 700 may be a data modem capable of being utilised with a host device, e.g. a tablet, laptop computer, etc. In such case, apparatus 700 may be fixedly integrated with or may be removably connectable to the host device, such as via a USB port. In these embodiments, user interface 750 may be very simple or may utilise features of the host computing device, such as the host device's display and/or keyboard.

Host interface 760 of device 700 also may take various forms depending on the particular embodiment of device 700. In embodiments where device 700 is a mobile phone, host interface 760 may comprise for example a USB interface, an HDMI interface, or the like. In the embodiments where device 700 is a data modem capable of being utilised with a host computing device, host interface may be for example a USB or PCMCIA interface.

In some embodiments, device 700 may comprise more functionality than is shown in FIG. 7. In some embodiments, device 700 may also comprise functionality such as a video and/or still-image camera, media player, etc., and radio transceiver 740 may include circuitry necessary to communicate using additional radio-frequency communication standards including GSM, GPRS, EDGE, UMTS, HSPA, CDMA2000, LTE, WiFi, Bluetooth, GPS, and/or others. Persons of ordinary skill in the art will recognise the above list of features and radio-frequency communication standards is merely exemplary and not limiting to the scope of the present disclosure. Accordingly, processor 710 may execute software code stored in program memory 720 to control such additional functionality.

Figure 8:
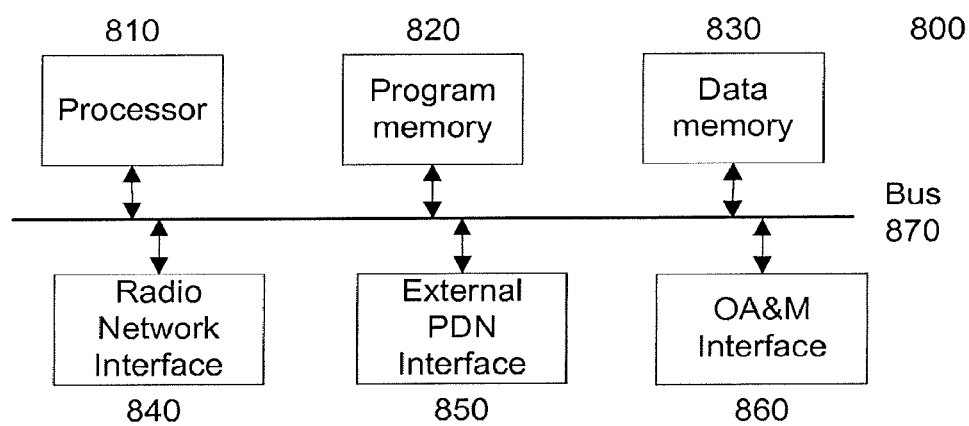
FIG. 8 shows a block diagram of an exemplary apparatus, such as a network equipment, according to one or more embodiments of the present disclosure.

FIG. 8 is a block diagram of exemplary network equipment 800, utilising certain embodiments of the present disclosure, including those described above with reference to FIGS. 1 to 6. Although network equipment 800 is shown in FIG. 8 as a single piece of equipment, this is only for purposes of explanation and illustration, and the person of ordinary skill will understand that the functionality of network equipment 800 may be spread across multiple pieces of equipment that are communicably coupled. For example, network equipment 800 may comprise functionality found in various network elements shown in FIG. 1 (e.g., SGSN, GGSN, MME/SGW, E-UTRAN/eNB, UTRAN/RNS/NB, GERAN/BSS/BTS) that are communicably coupled via interfaces specified in detail by various 3GPP standards.

Network equipment 800 comprises one or more processors that are operably connected to one or more program memories and one or more data memories. By way of example, network equipment 800 comprises processor 810, which is operably connected to program memory 820 and data memory 830 via bus 870, which may comprise parallel address and data buses, serial ports, or other methods and/or structures known to those of ordinary skill in the art. Program memory 820 comprises software code executed by processor 810 that enables network equipment 800 to communicate with one or more other devices using protocols according to various embodiments of the present disclosure, including UMTS PHY, MAC, RLC, PDCP, and RRC, and improvements thereto. Program memory 820 also comprises software code executed by processor 810 that enables network equipment 800 to communicate with one or more other devices using other protocols or protocol layers, such as one or more of the GMM/SM, X2, S1, and improvements thereto, or any other higher-layer protocols utilised in conjunction with radio network interface 840 and external packet data network (PDN) interface 850.

By way of example and without limitation, external PDN interface 850 may comprise the Gi interface and one or more other interfaces to external packet data networks such as the Internet. External PDN interface 850 may comprise interfaces standardised by 3GPP, Internet Engineering Task Force (IETF), or other organisations, or one or more interfaces otherwise known by persons of ordinary skill in the art. Radio network interface 850 may comprise one or more of the Um, Uu, and LTE-Uu interfaces, as standardised by 3GPP. Program memory 820 further comprises software code executed by processor 810 to control the functions of network equipment 800, including configuring and controlling various components such as radio network interface 840 and external PDN interface 850.

Data memory 830 may comprise memory area for processor 810 to store variables used in protocols, configuration, control, and other functions of network equipment 800. As such, program memory 820 and data memory 830 may comprise non-volatile memory (e.g. flash memory, hard disk, etc.), volatile memory (e.g., static or dynamic RAM), network-based (e.g. "cloud") storage, or a combination thereof. Persons of ordinary skill in the art will recognise that processor 810 may comprise multiple individual processors (not shown), each of which implements a portion of the functionality described above. In such case, multiple individual processors may be commonly connected to program memory 820 and data memory 830 or individually connected to multiple individual program memories and/or data memories. More generally, persons of ordinary skill in the art will recognise that various protocols and other functions of network equipment 800 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 840 may comprise transmitters, receivers, signal processors, ASICs, antennas, beamforming units, and other circuitry that enables network equipment 800 to communicate with other equipment such as, in some embodiments, a plurality of compatible UEs. In some embodiments, radio network interface may comprise various protocols or protocol layers, such as the UMTS PHY, MAC, RLC, PDCP, and RRC layer protocols standardised by 3GPP, improvements thereto such as described herein with reference to one of more FIGS. 1 through 6, or any other higher-layer protocols utilised in conjunction with radio network interface 840. In some embodiments, the radio network interface 840 may comprise a PHY layer based on orthogonal frequency division multiplexing (OFDM), orthogonal frequency division multiple access (OFDMA), code-division multiple access (CDMA), time-division multiple access (TDMA), frequency-division duplexing (FDD), time-division duplexing (TDD) technologies, or a combination thereof.

External PDN interface 850 may comprise transmitters, receivers and other circuitry that enables network equipment 800 to communicate with other equipment in a packet data network such as, in some embodiments, the Internet. In some embodiments, external PDN interface 850 may comprise the Gi interface standardised by 3GPP. In some embodiments, external PDN interface 850 may comprise other interfaces that are standardised or otherwise known to persons of ordinary skill in the art. In some embodiments, these one or more interfaces may be multiplexed together on a single physical interface. In some embodiments, lower layers of external PDN interface 850 may comprise one or more of asynchronous transfer mode (ATM), Internet Protocol (IP)-over-Ethernet, SDH over optical fibre, T1/E1/PDH over a copper wire, microwave radio, or other wired or wireless transmission technologies known to those of ordinary skill in the art.

OA&M interface 860 may comprise transmitters, receivers, and other circuitry that enables network equipment 800 to communicate with external networks, computers, databases, and the like for purposes of operations, administration, and maintenance of network equipment 800 or other network equipment operably connected thereto. Lower layers of OA&M interface 860 may comprise one or more of asynchronous transfer mode (ATM). Internet Protocol (IP)-over-Ethernet, SDH over optical fibre, T1/E1/PDH over a copper wire, microwave radio, or other wired or wireless transmission technologies known to those of ordinary skill in the art. Moreover, in some embodiments, one or more of radio network interface 840, external PDN interface 850, and OA&M interface 860 may be multiplexed together on a single physical interface, such as the examples listed above.

As described herein, a device or apparatus may be represented by a semiconductor chip, a chipset, or a (hardware) module comprising such chip or chipset; this, however, does not exclude the possibility that a functionality of a device or apparatus, instead of being hardware implemented, may be implemented as a software module such as a computer program or a computer program product comprising executable software code portions for execution or being run on a processor. A device or apparatus may be regarded as a device or apparatus, or as an assembly of multiple devices and/or apparatuses, whether functionally in cooperation with or independently of each other. Moreover, devices and apparatus may be implemented in a distributed fashion throughout a system, so long as the functionality of the device or apparatus is preserved. Such and similar principles are considered as known to a skilled person.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus configured to communicate via a plurality of cells subject to access controls, the apparatus comprising:
   circuitry configured to
      receive access control settings from a first cell, which is the apparatus' serving cell, the access control settings including at least one of a setting indicating whether origination of a connection is barred in the first cell, a setting indicating whether performing a registration is barred in the first cell, or a setting indicating whether responding to a request to establish a connection is barred in the first cell;
      store the received access control settings;
      establish a first connection via the first cell based on one or more of the access control settings;
      determine that the apparatus' serving cell has changed from the first cell to a second cell; and
      replace at least a portion of the plurality of access control settings with corresponding default access control settings not received from the second cell.

2. The apparatus of claim 1, wherein
the default access control settings comprise at least one of a setting indicating whether origination of a connection is barred in the second cell, a setting indicating whether performing a registration is barred in the second cell, or a setting indicating whether responding to a request to establish a connection is barred in the second cell.

3. The apparatus of claim 1, wherein
the access control settings comprise one or more packet-switched (PS) domain access control settings and one or more circuit-switched (CS) domain access control settings.

4. The apparatus of claim 3, wherein
the one or more PS domain access control settings comprise at least one of a setting indicating whether origination of a connection is barred in the PS domain, a setting indicating whether performing a registration is barred in the PS domain, and a setting indicating whether responding to a request to establish a connection is barred in the PS domain, and
the one or more CS domain access control settings comprise at least one of a setting indicating whether origination of a connection is barred in the CS domain, a setting indicating whether performing a registration is barred in the CS domain, and a setting indicating whether responding to a request to establish a connection is barred in the CS domain.

5. The apparatus of claim 1, wherein
the circuitry is configured to establish a second connection via the second cell based on one or more of the access control settings, wherein at least one of the access control settings used to establish the second connection is different from the access control settings used to establish the first connection.

6. The apparatus of claim 5, wherein
one of the first and second connections comprises a packet-switched (PS) domain connection and the other of the first and second connections is a circuit-switched (CS) domain connection.

7. The apparatus of claim 1, wherein
the first and the second cells each comprise a radio network subsystem (RNS),
the circuitry is configured to establish a Radio Resource Control (RRC) connection as the first connection,
the received access control settings comprise system information broadcast by the first RNS; and
the circuitry is configured to determine that the apparatus' serving cell has changed from the first cell to the second cell based on a received RRC message associated with a serving RNS (SRNS) relocation procedure.

8. The apparatus of claim 7, wherein the RRC message is one of the following messages:
RadioBearerReconfiguration, RadioBearerSetup, RadioBearerRelease, TransportChannelReconfiguration, PhysicalChannelReconfiguration, CellUpdateConfirm, URAUpdateConfirm, or UTRANMobilityInformation.

9. The apparatus of claim 7, wherein
the SRNS relocation procedure comprises a change in at least one of the apparatus' serving GPRS support node (SGSN) and the apparatus' serving mobile switching center (MSC).

10. The apparatus of claim 1, wherein
the access control settings comprise at least one of Domain Specific Access Control (DSAC) information or Paging Permission with Access Control (PPAC) information.

11. The apparatus of claim 10, wherein
the default access control settings comprise access class barring (ACB) information broadcast by the first cell.

12. The apparatus of claim 11, wherein
replacing at least a portion of the plurality of access control settings with corresponding default access control settings comprises deleting at least a portion of the DSAC and PPAC information that comprises the access control settings.

13. The apparatus of claim 1, wherein
the received access control settings comprise at least a portion of the default access control settings.

14. The apparatus of claim 1, wherein
at least a portion of the default access control settings are predefined.

15. The apparatus of claim 1, wherein
the default access control settings comprise one or more default access control settings associated with each of a plurality of access classes.

16. The apparatus of claim 15, wherein
the one or more default access control settings associated with a particular access class is associated with both packet-switched (PS) and circuit-switched (CS) domains.

17. The apparatus of claim 15, wherein
the one or more default access control settings associated with a particular access class is associated with at least one of a particular domain and a particular access type.

18. The apparatus of claim 1, wherein
the apparatus is a user equipment (UE) or component of a UE.

19. A method performed by an apparatus configured to communicate via a plurality of cells subject to access controls, the method comprising:
receiving access control settings from a first cell, which is the apparatus' serving cell, the access control settings including at least one of a setting indicating whether origination of a connection is barred in the first cell, a setting indicating whether performing a registration is barred in the first cell, or a setting indicating whether responding to a request to establish a connection is barred in the first cell;
storing the received access control settings;
establishing a first connection via the first cell based on one or more of the access control settings;
determining that the apparatus' serving cell has changed from the first cell to a second cell; and
replacing at least a portion of the plurality of access control settings with corresponding default access control settings not received from the second cell.

20. An apparatus comprising:
circuitry configured to
receive access control settings from a first cell, at least a first access control setting indicating whether origination of a connection is barred for a particular access class in the first cell;
store the received first access control setting;
establish a first connection via the first cell based on the first access control setting;
determine a serving cell has changed from the first cell to a second cell; and
replace the first access control setting with a corresponding default access control setting not received from the second cell.

* * * * *